Patented Apr. 3, 1934

1,953,499

UNITED STATES PATENT OFFICE 1,953,499

PROCESS FOR THE PRODUCTION OF ACETONE FROM ACETYLENE

Walter Pohl, Bruchhausen, Germany, assignor to Deutsche Gold- und Silber-Scheideanstalt vormals Roessler, Frankfort - on - the - Main, Germany, a corporation of Germany No Drawing. Application October 6, 1931, Serial No. 567,307. In Germany October 6, 1930

10 Claims. (Cl. 260—134)

It is well known to produce acetone by causing acetylene and water vapour to react with one another at high temperatures in the presence of catalysts. For this purpose there may be used as catalysts for example oxygen compounds of metals, preferably mixtures of a number of metal-oxygen compounds or also mixtures of metal-oxygen compounds with metals themselves. It has already been proposed to so compose mixed catalysts that their oxygen tension at the working temperatures used is so close to the oxygen partial pressure present in the reaction mixture that in the course of the reaction operation there does not take place either a substantial reduction or a substantial oxidation of the catalyst, for example in such a manner that when treating a mixture of one part of acetylene and more than five parts, preferably 10 to 20 parts, of water vapour at temperatures of 400 to 500° C. the oxygen tension of the catalyst mixture lies between 10–32 and 10–25 atmospheres.

It has been found that the production of acetone from acetylene and water vapour at high temperatures in the presence of catalysts, particularly those of the character above referred to, can be carried out, whilst obtaining particular advantages when the operation is carried out at pressures which are higher than atmospheric pressure.

The operation according to the present invention has amongst others the important advantage that the catalysts possess a duration of action which lasts for a particularly long time. This effect is due to the fact that when operating under increased pressure high molecular substances, which are formed in small quantities during the course of the operation, are not deposited on the catalyst by reason of the high water vapour pressure or are immediately again removed.

A further advantage of the present process resides therein that slight quantities of undesirable combustion products, as for example carbon dioxide, occur. The acetylene which is not converted into acetone is recovered as such.

To the above must also be added the technical and probably important circumstance that the carrying off of the reaction heat is simpler and more convenient as the heat conducting capacity of compressed gases is better than that of dilute gases.

By working at high pressure an increase of the average per unit of volume of the catalyst is possible by a multiple whilst obtaining good yields. In spite of high averages the large quantities of heat of the reaction can be carried off with certainty. Thus the reaction temperature may be made constant within the desired limits.

The successful carrying into effect of the process was not anticipated as it is well known that acetylene under pressure on the one hand is explosive and on the other hand easily gives rise to the formation of undesirable condensing products.

The process can be carried out according to the known methods of operation as have been indicated for a method of operation at atmospheric pressure. As reaction temperatures there are preferably used temperatures of 250 to 700° C. preferably between 400 to 500° C. As regards high pressures there may be used pressures up to 10 atmospheres preferably from 3 to 5 atmospheres.

As catalysts there may be used all suitable ketonizing catalysts particularly for example heavy metal oxides, such as those of iron, manganese, cobalt, thorium, cerium, tin and the like as also combinations of various of these heavy metal oxides. Further there may be also used heavy metal oxides and heavy metal oxide combinations with simultaneous activation by one or more oxygen compounds of metals of the second group of the periodic system, for example of the earth metals, as for example magnesium oxide, magnesium carbonate, calcium oxide, calcium carbonate, zinc oxide, zinc carbonate, or of aluminium, for example aluminium oxide and the like together with these as catalysts. The heavy metal oxides or the combinations thereof may be used activated with the metals of the second group of the periodic system or with aluminium itself and used in this form as catalysts. There may also be used combinations of metal-oxygen compounds of the character above referred to with other metals, preferably for example in such a manner that a metal, for example iron serves as carrier and there are provided thereon the active substances, for example iron oxides or combinations of iron oxides with other metal-oxygen compounds of the character referred to.

The superiority of the invention relatively to the known processes will be clear from the following comparative examples.

1. Over a catalyst consisting of rusty iron sponge impregnated with iron acetate and manganese acetate there was constantly passed at 470° C. under atmospheric pressure a mixture of 18 litres of acetylene and 230 litres of water vapour. The yield in acetone amounted on an average to about 87% of the theoretical amount. After 40 hours the activity of the contact had been reduced to such an extent that the waste gases contained 10% of unchanged acetylene whilst there were present 7% of undesirable combustion products.

2. When operating under exactly the same conditions and with the same contact as in the preceding Example 1, but with the precaution that a pressure of 5 atmospheres was used, the life of the contact amounted to 128 hours when the waste gases contained 10% of undecomposed acetylene. There were only obtained 2% of undesirable gaseous combustion products. To the end of the experiment the yield was the same as in Example 1.

3. Over a catalyst consisting of oxidized iron sponge impregnated with zinc acetate there was passed at 420° C. at atmospheric pressure a mixture of 10.4 litres acetylene and 159 litres of water vapour per litre of contact mass per hour for a period of 12 hours. There was obtained a yield of acetone amounting to 85.8% of the theoretical amount calculated on the acetylene used. There were obtained 1.5% undesirable combustion products and 9.6% of undecomposed acetylene.

4. Over a catalyst of the character referred to in Example 3 with the same impregnation on oxidized iron sponge there was passed at 440° C. under a pressure of 4.8 atmospheres a mixture of 19.8 litres of acetylene and 342 litres of water vapour per litre of contact mass per hour for the same period of 12 hours as in Example 3. There was obtained a yield in acetone amounting to 90.4% of the theoretical amount calculated on the acetylene used. 0.8% undesirable combustion products and 7.7% of undecomposed acetylene were obtained.

5. Over a catalyst which was obtained by impregnating oxidized iron sponge with acetates of zinc, iron and manganese in the proportion of 10:2:1 there was passed per hour at 440° C. a mixture of 19 litres of acetylene and 342 litres of water vapour per litre of contact mass. The pressure at which the operation was carried out amounted to 4.8 atmospheres. During a period of 280 hours there was obtained a yield in acetone of 89.7% of the theoretical amount calculated on the acetylene used. There were obtained 1.6% undesirable combustion products, whilst 6.3% acetylene, both calculated on the amount of acetylene used, were not decomposed.

The waste gas consists of 32.5% carbon dioxide, 4.4% acetylene, 66.0% hydrogen and 2.1% methane. A particular advantage of ketonizing under pressure is seen in the fact that when treating the reaction gases for hydrogen this can be set free directly without further compression by treatment of carbon dioxide and acetylene with water under pressure. The resultant hydrogen may, for example, be used for hydrogenations of all kinds.

6. Over a catalyst which was obtained by impregnating oxidized iron sponge with acetate of zinc, iron and manganese in the proportion of 10:2:1 there was passed per hour at 450 to 460° a mixture of 38.2 litres of acetylene and 672 litres of water vapour per litre of contact mass. The operation was carried out under a pressure of 4.8 atmospheres. There was obtained a yield in acetone amounting to 85%. The undesirable combustion products obtained amounted to 3.6%, whilst 10% of the acetylene, both calculated on the amount of acetylene used, was not decomposed. When operating without pressure the amount of undesirable combustion products amounts to from 6 to 8% with the same quantity of materials. Such a large average per unit of volume of contact was hitherto not possible as the quantities of heat set up during the reaction could only be carried off with considerable difficulty. By operating at high pressures this was considerably improved so that also under the above conditions a very high yield in acetone was obtained.

I claim:—

1. A process for the production of acetone from acetylene, consisting in catalytically causing acetylene and water vapour to react with each other to form acetone at temperatures of 250 to 700° C. and maintaining a pressure at least about three atmospheres and not exceeding 10 atmospheres on said acetylene and water vapor while reacting to form acetone.

2. A process for the production of acetone from acetylene, consisting in catalytically causing acetylene and water vapour to react with each other to form acetone at temperatures of 250 to 700° C. in the presence of a catalyst containing an oxide of the metal of the group consisting of iron, manganese, cobalt, thorium, cerium and tin and maintaining a pressure of at least about 3 atmospheres and not exceeding 10 atmospheres on said acetylene and water vapour while reacting to form acetone.

3. A process for the production of acetone from acetylene, consisting in catalytically causing acetylene and water vapour to react with each other to form acetone at temperatures of 250 to 700° C. in the presence of a catalyst containing an oxide of the metal of the group consisting of iron, manganese, cobalt, thorium, cerium and tin and containing an oxygen compound of a metal of the group consisting of magnesium, calcium, zinc and aluminum, and maintaining a pressure of at least about 3 atmospheres and not exceeding 10 atmospheres on said acetylene and water vapour while reacting to form acetone.

4. A process for the production of acetone from acetylene, consisting in catalytically causing acetylene and water vapour to react with each other to form acetone at temperatures of 250 to 700° C. in the presence of a catalyst containing an oxide of the metal of the group consisting of iron, manganese, cobalt, thorium, cerium and tin and containing an oxygen compound of an alkaline earth metal, and maintaining a pressure of at least about 3 atmospheres and not exceeding 10 atmospheres on said acetylene and water vapour while reacting to form acetone.

5. A process for the production of acetone from acetylene, consisting in catalytically causing acetylene and water vapour to react with each other to form acetone at temperatures of 250 to 700° C. in the presence of a catalyst containing an oxide of the metal of the group consisting of iron, manganese, cobalt, thorium, cerium and tin and containing an oxygen compound of aluminum, and maintaining a pressure of at least about 3 atmospheres and not exceeding 10 atmospheres on said acetylene and water vapour while reacting to form acetone.

6. A process for the production of acetone from acetylene, consisting in catalytically causing acetylene and water vapour to react with each other to form acetone at temperatures of 250 to 700° C. in the presence of a catalyst containing an oxide of the metal of the group consisting of iron, manganese, cobalt, thorium, cerium and tin and containing a metal of the group consisting of aluminum, zinc, iron, manganese, cobalt, thorium, cerium and tin, and maintaining a pressure of at least about 3 atmospheres and not exceeding 10 atmospheres on said acetylene and water vapour while reacting to form acetone.

7. A process for the production of acetone from acetylene, consisting in catalytically causing acetylene and water vapour to react with each other to form acetone at temperatures of 250 to 700° C. in the presence of a catalyst containing an oxide of the metal of the group consisting of iron, manganese, cobalt, thorium, cerium and tin and containing a heavy metal of the group consisting of iron, manganese, cobalt, thorium, cerium and tin, and maintaining a pressure of at least about 3 atmospheres and not exceeding 10 atmospheres on said acetylene and water vapour while reacting to form acetone.

8. A process for the production of acetone from acetylene, consisting in catalytically causing acetylene and water vapour to react with each other to form acetone at temperatures of 250 to 700° C. in the presence of a catalyst containing an oxide of the metal of the group consisting of iron, manganese, cobalt, thorium, cerium and tin and containing aluminum, and maintaining a pressure of at least about 3 atmospheres and not exceeding 10 atmospheres on said acetylene and water vapour while reacting to form acetone.

9. A process for the production of acetone from acetylene, consisting in catalytically causing acetylene and water vapour to react with each other to form acetone at temperatures of 380 to 550° C. in the presence of a catalyst containing an oxide of the metal of the group consisting of iron, manganese, cobalt, thorium, cerium and tin and maintaining a pressure of at least about 3 atmospheres and not exceeding 10 atmospheres on said acetylene and water vapour while reacting to form acetone.

10. A process for the production of acetone from acetylene, consisting in catalytically causing acetylene and water vapour to react with each other to form acetone at temperatures of 400 to 500° C. in the presence of a catalyst containing an oxide of the metal of the group consisting of iron, manganese, cobalt, thorium, cerium and tin and maintaining a pressure of at least about 3 atmospheres and not exceeding 10 atmospheres on said acetylene and water vapour while reacting to form acetone.

WALTER POHL.